US009003422B2

(12) United States Patent
Hakewill et al.

(10) Patent No.: US 9,003,422 B2
(45) Date of Patent: *Apr. 7, 2015

(54) MICROPROCESSOR ARCHITECTURE HAVING EXTENDIBLE LOGIC

(71) Applicant: Synopsys, Inc., Mountain View, CA (US)

(72) Inventors: James Robert Howard Hakewill, Los Gatos, CA (US); Richard A. Fuhler, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,194

(22) Filed: Mar. 21, 2014

(65) Prior Publication Data

US 2014/0208087 A1   Jul. 24, 2014

Related U.S. Application Data

(63) Continuation of application No. 11/132,424, filed on May 19, 2005, now Pat. No. 8,719,837.

(60) Provisional application No. 60/572,238, filed on May 19, 2004.

(51) Int. Cl.
*G06F 9/46* (2006.01)
*G06F 9/38* (2006.01)
(Continued)

(52) U.S. Cl.
CPC ............. *G06F 9/3861* (2013.01); *G06F 5/01* (2013.01); *G06F 9/30032* (2013.01);
(Continued)

(58) Field of Classification Search
None
See application file for complete search history.

(56) References Cited

U.S. PATENT DOCUMENTS 4,216,539 A   8/1980   Raymond et al.
4,342,082 A   7/1982   Brown et al.
(Continued)

FOREIGN PATENT DOCUMENTS

EP   0055370 A2   7/1982
JP   06 332693 A   12/1994
(Continued)

OTHER PUBLICATIONS

Gilson, Kent L. et al., "The Nano Processor: a Low Resource Reconfigurable Processor" IEEE Workshop on FPGAs for Custom Computing Machines, Apr. 11, 2004, p. 2, col. 2, paragraphs 3-4; p. 3, col. 1, paragraph 3 to col. 2, paragraph 2; p. 5, col. 1, paragraph 6 to col. 1, paragraph 3; and Figure 2.
(Continued)

*Primary Examiner* — Gregory A Kessler
(74) *Attorney, Agent, or Firm* — Fenwick & West LLP

(57) ABSTRACT

A microprocessor architecture having extendible logic. One or more customized applications are available to the instruction pipeline. The customizable applications may include software, extension logic instruction or register, dynamically configurable hardware logic, or combinations of these. In order to enable the operating system to interface with the customized extension applications, at least one software extension is provided to the operating system. When a specific extension is requested a software exception is generated by the OS. In response to the exception, the least one software extension is called to handle context switch and dynamic configuration of the extendible logic of the microprocessor.

20 Claims, 2 Drawing Sheets

(51) Int. Cl.

| | | |
|---|---|---|
| *G06F 5/01* | (2006.01) | |
| *G06F 9/30* | (2006.01) | |
| *G06F 9/32* | (2006.01) | |
| *G06F 11/36* | (2006.01) | |
| *G06F 15/78* | (2006.01) | |
| *G06F 12/08* | (2006.01) | |

(52) U.S. Cl.
 CPC ....... *G06F 9/30036* (2013.01); *G06F 9/30149* (2013.01); *G06F 9/30181* (2013.01); *G06F 9/325* (2013.01); *G06F 9/3802* (2013.01); *G06F 9/3806* (2013.01); *G06F 9/3816* (2013.01); *G06F 9/3844* (2013.01); *G06F 9/3846* (2013.01); *G06F 9/3885* (2013.01); *G06F 9/3897* (2013.01); *G06F 11/3648* (2013.01); *G06F 15/7867* (2013.01); *G06F 9/32* (2013.01); *G06F 12/0802* (2013.01); *Y02B 60/1225* (2013.01); *Y02B 60/1207* (2013.01)

(56) References Cited

U.S. PATENT DOCUMENTS

| | | | |
|---|---|---|---|
| 4,594,659 | A | 6/1986 | Guenthner et al. |
| 4,829,460 | A | 5/1989 | Ito et al. |
| 4,831,571 | A | 5/1989 | Tokumaru et al. |
| 4,905,178 | A | 2/1990 | Mor et al. |
| 4,914,622 | A | 4/1990 | Sfarti et al. |
| 4,926,323 | A | 5/1990 | Baror et al. |
| 4,939,684 | A | 7/1990 | Gehrig et al. |
| 4,962,500 | A | 10/1990 | Nakagawa |
| 5,148,532 | A | 9/1992 | Narita et al. |
| 5,155,698 | A | 10/1992 | Niimi et al. |
| 5,155,843 | A | 10/1992 | Stamm et al. |
| 5,220,670 | A | 6/1993 | Arakawa et al. |
| 5,274,770 | A | 12/1993 | Khim Yeoh et al. |
| 5,294,928 | A | 3/1994 | Cooper et al. |
| 5,295,250 | A | 3/1994 | Komoto et al. |
| 5,317,701 | A | 5/1994 | Reininger et al. |
| 5,327,536 | A | 7/1994 | Suzuki |
| 5,333,119 | A | 7/1994 | Raatz et al. |
| 5,423,011 | A | 6/1995 | Blaner |
| 5,450,586 | A | 9/1995 | Kuzara et al. |
| 5,454,117 | A | 9/1995 | Puziol et al. |
| 5,475,856 | A | 12/1995 | Kogge |
| 5,485,625 | A | 1/1996 | Gumkowski |
| 5,493,687 | A | 2/1996 | Garg et al. |
| 5,509,129 | A | 4/1996 | Guttag et al. |
| 5,517,436 | A | 5/1996 | Andreas et al. |
| 5,530,825 | A | 6/1996 | Black et al. |
| 5,542,074 | A | 7/1996 | Kim et al. |
| 5,560,036 | A | 9/1996 | Yoshida |
| 5,566,357 | A | 10/1996 | Holcman |
| 5,584,031 | A | 12/1996 | Burch et al. |
| 5,586,279 | A | 12/1996 | Pardo et al. |
| 5,590,350 | A | 12/1996 | Guttag et al. |
| 5,590,351 | A | 12/1996 | Sowadsky et al. |
| 5,600,674 | A | 2/1997 | Bonet et al. |
| 5,600,847 | A | 2/1997 | Guttag et al. |
| 5,636,363 | A | 6/1997 | Bourekas et al. |
| 5,642,500 | A | 6/1997 | Inoue |
| 5,655,122 | A | 8/1997 | Wu |
| 5,692,168 | A | 11/1997 | McMahan |
| 5,696,954 | A | 12/1997 | Guttag et al. |
| 5,696,958 | A | 12/1997 | Mowry et al. |
| 5,713,028 | A | 1/1998 | Takahashi et al. |
| 5,727,211 | A | 3/1998 | Gulsen |
| 5,752,014 | A | 5/1998 | Mallick et al. |
| 5,768,602 | A | 6/1998 | Dhuey |
| 5,774,709 | A | 6/1998 | Worrell |
| 5,778,423 | A | 7/1998 | Sites et al. |
| 5,784,636 | A | 7/1998 | Rupp |
| 5,805,876 | A | 9/1998 | Bose et al. |
| 5,809,293 | A | 9/1998 | Bridges et al. |
| 5,826,079 | A | 10/1998 | Boland et al. |
| 5,826,100 | A | 10/1998 | Bonet et al. |
| 5,835,753 | A | 11/1998 | Witt |
| 5,848,264 | A | 12/1998 | Baird et al. |
| 5,878,264 | A | 3/1999 | Ebrahim |
| 5,893,151 | A | 4/1999 | Merchant |
| 5,896,305 | A | 4/1999 | Bosshart et al. |
| 5,907,498 | A | 5/1999 | Rim |
| 5,909,566 | A | 6/1999 | Cai et al. |
| 5,920,711 | A | 7/1999 | Seawright et al. |
| 5,931,950 | A | 8/1999 | Hsu |
| 5,948,099 | A | 9/1999 | Crawford et al. |
| 5,950,120 | A | 9/1999 | Gardner et al. |
| 5,964,884 | A | 10/1999 | Partovi et al. |
| 5,978,909 | A | 11/1999 | Lempel |
| 5,996,071 | A | 11/1999 | White et al. |
| 6,014,743 | A | 1/2000 | Henry et al. |
| 6,021,500 | A | 2/2000 | Wang et al. |
| 6,026,478 | A | 2/2000 | Dowling |
| 6,029,222 | A | 2/2000 | Kamiya |
| 6,035,374 | A | 3/2000 | Panwar et al. |
| 6,038,649 | A | 3/2000 | Ozawa et al. |
| 6,044,458 | A | 3/2000 | Rinkenberger et al. |
| 6,058,142 | A | 5/2000 | Ishikawa et al. |
| 6,061,521 | A | 5/2000 | Thayer et al. |
| 6,076,158 | A | 6/2000 | Sites et al. |
| 6,088,034 | A | 7/2000 | Deering |
| 6,088,786 | A | 7/2000 | Feierbach et al. |
| 6,128,747 | A | 10/2000 | Thoulon |
| 6,141,673 | A | 10/2000 | Thayer et al. |
| 6,151,672 | A | 11/2000 | Hunt |
| 6,154,857 | A | 11/2000 | Mann |
| 6,157,988 | A | 12/2000 | Dowling |
| 6,163,851 | A | 12/2000 | Yamazoe et al. |
| 6,185,732 | B1 | 2/2001 | Mann et al. |
| 6,189,091 | B1 | 2/2001 | Col et al. |
| 6,226,738 | B1 | 5/2001 | Dowling |
| 6,240,521 | B1 | 5/2001 | Barber et al. |
| 6,253,287 | B1 | 6/2001 | Green |
| 6,289,417 | B1 | 9/2001 | Larri |
| 6,292,879 | B1 | 9/2001 | Fong |
| 6,308,249 | B1 | 10/2001 | Okazawa |
| 6,308,279 | B1 | 10/2001 | Toll et al. |
| 6,327,651 | B1 | 12/2001 | Dubey et al. |
| 6,339,822 | B1 | 1/2002 | Miller |
| 6,343,337 | B1 | 1/2002 | Dubey et al. |
| 6,347,379 | B1 | 2/2002 | Dai et al. |
| 6,353,882 | B1 | 3/2002 | Hunt |
| 6,412,038 | B1 | 6/2002 | Mehalel |
| 6,412,066 | B2 | 6/2002 | Worrell et al. |
| 6,427,206 | B1 | 7/2002 | Yeh et al. |
| 6,438,700 | B1 | 8/2002 | Adusumilli |
| 6,477,683 | B1 | 11/2002 | Killian et al. |
| 6,499,101 | B1 | 12/2002 | Henry et al. |
| 6,519,696 | B1 | 2/2003 | Henry et al. |
| 6,526,502 | B1 | 2/2003 | Col et al. |
| 6,550,056 | B1 | 4/2003 | Mizumoto |
| 6,560,754 | B1 | 5/2003 | Hakewill et al. |
| 6,571,331 | B2 | 5/2003 | Henry et al. |
| 6,571,333 | B1 | 5/2003 | Jain et al. |
| 6,584,525 | B1 | 6/2003 | Klingman |
| 6,609,194 | B1 | 8/2003 | Henry et al. |
| 6,622,240 | B1 | 9/2003 | Olson et al. |
| 6,647,491 | B2 | 11/2003 | Hsu et al. |
| 6,671,743 | B1 | 12/2003 | Verity |
| 6,681,295 | B1 | 1/2004 | Root et al. |
| 6,718,460 | B1 | 4/2004 | Prakash |
| 6,718,504 | B1 | 4/2004 | Coombs et al. |
| 6,751,331 | B2 | 6/2004 | Eisenbraun |
| 6,760,833 | B1 | 7/2004 | Dowling |
| 6,774,832 | B1 | 8/2004 | Essenwanger |
| 6,823,444 | B1 | 11/2004 | Henry et al. |
| 6,862,563 | B1 | 3/2005 | Hakewill et al. |
| 6,886,093 | B2 | 4/2005 | Henry et al. |
| 6,895,424 | B2 | 5/2005 | Kirsch |
| 6,909,744 | B2 | 6/2005 | Molloy |
| 6,925,634 | B2 | 8/2005 | Hunter |
| 6,948,052 | B2 | 9/2005 | Nguyen et al. |
| 6,954,845 | B2 | 10/2005 | Arnold et al. |
| 6,963,554 | B1 | 11/2005 | Weigand |

(56) References Cited

U.S. PATENT DOCUMENTS

| | | |
|---|---|---|
| 6,968,444 B1 | 11/2005 | Kroesche et al. |
| 6,981,012 B2 | 12/2005 | Kirsch |
| 7,010,558 B2 | 3/2006 | Morris |
| 7,093,165 B2 | 8/2006 | Kageshima |
| 7,162,619 B2 | 1/2007 | Henry et al. |
| 7,181,596 B2 | 2/2007 | Henry et al. |
| 2001/0016903 A1 | 8/2001 | Tremblay |
| 2001/0021974 A1 | 9/2001 | Lee |
| 2001/0032309 A1 | 10/2001 | Henry et al. |
| 2001/0040686 A1 | 11/2001 | Schoolcraft et al. |
| 2001/0044892 A1 | 11/2001 | Yamaura |
| 2001/0046260 A1 | 11/2001 | Molloy |
| 2001/0050682 A1 | 12/2001 | Deering et al. |
| 2001/0056531 A1 | 12/2001 | McFarling |
| 2002/0053015 A1 | 5/2002 | Tan et al. |
| 2002/0066006 A1 | 5/2002 | Worrell |
| 2002/0069351 A1 | 6/2002 | Chi et al. |
| 2002/0073301 A1 | 6/2002 | Kahle et al. |
| 2002/0078332 A1 | 6/2002 | Seznec et al. |
| 2002/0083312 A1 | 6/2002 | Sinharoy |
| 2002/0087851 A1 | 7/2002 | Yoshioka |
| 2002/0087852 A1 | 7/2002 | Jourdan et al. |
| 2002/0100019 A1 | 7/2002 | Hunter et al. |
| 2002/0100020 A1 | 7/2002 | Hunter et al. |
| 2002/0138236 A1 | 9/2002 | Takamura |
| 2002/0157000 A1 | 10/2002 | Hay et al. |
| 2002/0188833 A1 | 12/2002 | Henry et al. |
| 2002/0194236 A1 | 12/2002 | Morris |
| 2002/0194238 A1 | 12/2002 | Kirsch |
| 2002/0194461 A1 | 12/2002 | Henry et al. |
| 2002/0194462 A1 | 12/2002 | Henry et al. |
| 2002/0194463 A1 | 12/2002 | Henry et al. |
| 2002/0194464 A1 | 12/2002 | Henry et al. |
| 2002/0198916 A1 | 12/2002 | Kirsch |
| 2002/0199092 A1 | 12/2002 | Henry et al. |
| 2003/0023838 A1 | 1/2003 | Karim et al. |
| 2003/0046614 A1 | 3/2003 | Brokish |
| 2003/0070013 A1 | 4/2003 | Hansson |
| 2003/0105793 A1 | 6/2003 | Guttag et al. |
| 2003/0126508 A1 | 7/2003 | Litt |
| 2003/0154359 A1 | 8/2003 | Henry et al. |
| 2003/0154463 A1 | 8/2003 | Betker et al. |
| 2003/0159009 A1 | 8/2003 | Henry et al. |
| 2003/0159020 A1 | 8/2003 | Henry et al. |
| 2003/0172252 A1 | 9/2003 | Henry et al. |
| 2003/0188129 A1 | 10/2003 | Henry et al. |
| 2003/0188130 A1 | 10/2003 | Henry et al. |
| 2003/0188131 A1 | 10/2003 | Henry et al. |
| 2003/0188133 A1 | 10/2003 | Henry et al. |
| 2003/0188140 A1 | 10/2003 | Henry et al. |
| 2003/0196077 A1 | 10/2003 | Henry et al. |
| 2003/0204705 A1 | 10/2003 | Oldfield et al. |
| 2003/0221091 A1 | 11/2003 | Henry et al. |
| 2003/0225998 A1 | 12/2003 | Khan et al. |
| 2004/0015683 A1 | 1/2004 | Emma et al. |
| 2004/0049660 A1 | 3/2004 | Jeppesen et al. |
| 2004/0068643 A1 | 4/2004 | Dowling |
| 2004/0098569 A1 | 5/2004 | Smith et al. |
| 2004/0139281 A1 | 7/2004 | McDonald |
| 2004/0172524 A1 | 9/2004 | Hoogerbrugge |
| 2004/0186985 A1 | 9/2004 | Tran et al. |
| 2004/0193843 A1 | 9/2004 | Altshuler et al. |
| 2004/0193852 A1 | 9/2004 | Johnson |
| 2004/0193855 A1 | 9/2004 | Kacevas et al. |
| 2004/0225870 A1 | 11/2004 | Srinivasan et al. |
| 2004/0225871 A1 | 11/2004 | Irie et al. |
| 2004/0225872 A1 | 11/2004 | Bonanno et al. |
| 2004/0225949 A1 | 11/2004 | Coombs et al. |
| 2004/0230782 A1 | 11/2004 | Busaba et al. |
| 2004/0250045 A1 | 12/2004 | Dowling |
| 2004/0254965 A1 | 12/2004 | Giernalczyk et al. |
| 2004/0255100 A1 | 12/2004 | Kershaw |
| 2004/0255104 A1 | 12/2004 | Akkary et al. |
| 2004/0268102 A1 | 12/2004 | Combs et al. |
| 2005/0027970 A1 | 2/2005 | Arnold et al. |
| 2005/0027971 A1 | 2/2005 | Williams et al. |
| 2005/0027974 A1 | 2/2005 | Lempel |
| 2005/0050309 A1 | 3/2005 | Yamashita et al. |
| 2005/0060457 A1 | 3/2005 | Olukotun |
| 2005/0066305 A1 | 3/2005 | Lisanke |
| 2005/0076193 A1 | 4/2005 | Henry et al. |
| 2005/0091479 A1 | 4/2005 | Chung |
| 2005/0097398 A1 | 5/2005 | Day et al. |
| 2005/0102492 A1 | 5/2005 | Henry et al. |
| 2005/0125613 A1 | 6/2005 | Kim et al. |
| 2005/0125632 A1 | 6/2005 | Alsup et al. |
| 2005/0125634 A1 | 6/2005 | Ishizuka |
| 2005/0132175 A1 | 6/2005 | Henry et al. |
| 2005/0138607 A1 | 6/2005 | Lu |
| 2005/0154867 A1 | 7/2005 | DeWitt et al. |
| 2005/0169550 A1 | 8/2005 | Arnold et al. |
| 2005/0172277 A1 | 8/2005 | Chheda et al. |
| 2005/0174270 A1 | 8/2005 | Koo et al. |
| 2005/0188179 A1 | 8/2005 | Henry et al. |
| 2005/0204121 A1 | 9/2005 | Burdass |
| 2005/0216703 A1 | 9/2005 | Dieffenderfer et al. |
| 2005/0216713 A1 | 9/2005 | Prasky et al. |
| 2005/0223202 A1 | 10/2005 | Peri et al. |
| 2005/0273559 A1 | 12/2005 | Aristodemou et al. |
| 2005/0273581 A1 | 12/2005 | Arnold et al. |
| 2005/0278505 A1 | 12/2005 | Lim et al. |
| 2005/0278513 A1 | 12/2005 | Aristodemou et al. |
| 2005/0278517 A1 | 12/2005 | Wong et al. |
| 2005/0289323 A1 | 12/2005 | Wong et al. |
| 2006/0015706 A1 | 1/2006 | Lai |
| 2006/0036836 A1 | 2/2006 | Gelman et al. |
| 2006/0041868 A1 | 2/2006 | Huang |

FOREIGN PATENT DOCUMENTS

| | | |
|---|---|---|
| JP | 2001 282548 A | 10/2001 |
| WO | WO 96/09583 A | 9/1995 |

OTHER PUBLICATIONS

Hennessy, John L. et al., A Computer Architecture: A Quantitative Approach, Second Edition, San Francisco, California: Morgan Kaufman Publishers, Inc. 1996, p. 71, paragraph 4; pp. 87-88, paragraphs 8 to 1; Figure 2.17 and Caption.

Altera, FLEX 10K—Embedded Programmable Logic Device Family, 2003, Altera, pp. 1, 6.

Back, D. et al., "Evaluation of Techniques for Reducing the Energy-Delay Product in a JAVA Processor," Chalmers University of Technology, Department of Computer Engineering, 1999, 12 pages.

Fritts, J. et al., "Instruction Fetch Characteristics of Media Processing," Proceedings of SPIE Photonics West, Media Processors, 2002, pp. 1-12.

Hennessy et al, Computer Architecture—A Quantitative Approach, Morgan Kaufmann Publishiers, 2003, pp. 197-199.

McFarling, S. et al., "Reducing the Cost of Branches," IEEE, 1986, pp. 396-403.

Lee, J.K.F. et al., "Branch Prediction Strategies and Branch Target Buffer Design," IEEE Computer, Jan. 1984, pp. 6-22.

Johnson, W., Superscalar Microprocessor Design, Prentice Hall, 1991, p. 22.

Patterson, D. A. et al., "A Computer Architecture: A Quantitative Approach," Second Edition, San Francisco. California: Morgan Kaufman Publishers, Inc., 1990, pp. 252-278.

PCT International Search Report, PCT Application No. PCT/US01/51064, Jan. 15, 2003, 5 pages.

PCT International Search Report and Written Opinion, PCT Application No. PCT/US05/17586, Nov. 27, 2006, 18 pages.

PCT International Search Report, PCT/GB95/02283, Apr. 19, 1996, 3 pages.

Sherwood, T. et al., "Automated Design of Finite State Machine Predictors for Customized Processors," IEEE, 2001, pp. 86-97.

Su, C-L. et al., "Low Power Architecture Design and Compilation Techniques for High-Performance Processor," published in Proceedings of COMPCON 1994, Apr. 1994, dated Feb. 15, 1994.

(56) References Cited

OTHER PUBLICATIONS

Tabak, D., "Advanced Microprocessors," McGraw-Hill, Second Edition, 1995, ISBN 0-07-062843-2, Chapter 5: Pipelining, pp. 67-78.
UK Examination Report, UK Patent Application No. GB0622477.8, Dec. 3, 2007, 1 page.
United States Office Action, U.S. Appl. No. 11/132,423, Jan. 22, 2008, 14 pages.
United States Office Action, U.S. Appl. No. 11/132,423, Jun. 22, 2007, 19 pages.
United States Office Action, U.S. Appl. No. 11/132,423, Feb. 27, 2007, 14 pages.
United States Office Action, U.S. Appl. No. 11/132,432, Jul. 3, 2007, 8 pages.
United States Office Action, U.S. Appl. No. 10/083,057, May 20, 2004.
United States Office Action, U.S. Appl. No. 10/083,057, Jun. 17, 2005, 15 pages.
United States Office Action, U.S. Appl. No. 11/132,428, Mar. 19, 2008, 10 pages.
United States Office Action, U.S. Appl. No. 11/132,428, Jun. 7, 2007, 8 pages.
United States Office Action, U.S. Appl. No. 11/132,447, Feb. 27, 2007, 20 pages.
United States Office Action, U.S. Appl. No. 11/132,447, Jul. 18, 2007, 19 pages.
United States Office Action, U.S. Appl. No. 11/132,448, Jan. 8, 2009, 11 pages.
United States Office Action, U.S. Appl. No. 11/132,448, Jul. 18, 2008, 11 pages.
U.S. Appl. No. 10/423,745 (issued as U.S. Patent 7,475,000), filed Apr. 25, 2003, Inventors Cook et al.
U.S. Appl. No. 10/651,560, filed Aug. 29, 2003, Inventors Hewitt et al.
Wirthlin, M.J. et al., "The Nano Processor: A Low Resource Reconfigurable Processor," IEEE Workshop on FPGAs for Custom Computing Machines, Apr. 11, 1994, pp. 23-30.
United States Office Action, U.S. Appl. No. 11/132,424, Sep. 18, 2013, 24 pages.
United States Office Action, U.S. Appl. No. 11/132,424, Oct. 23, 2012, 20 pages.
United States Office Action, U.S. Appl. No. 11/132,424, Jun. 5, 2012, 18 pages.
United States Office Action, U.S. Appl. No. 11/132,424, Mar. 31, 2010, 19 pages.
United States Office Action, U.S. Appl. No. 11/132,424, Sep. 16, 2009, 20 pages.

MICROPROCESSOR ARCHITECTURE HAVING EXTENDIBLE LOGIC

CROSS REFERENCE TO RELATED APPLICATIONS

This application is a continuation of U.S. patent application Ser. No. 11/132,424, filed on May 19, 2005 which priority to provisional application No. 60/572,238 filed May 19, 2004, each of which is incorporated by reference in its entirety.

FIELD

This invention relates generally to microprocessor architecture and more specifically to an improved architecture and mode of operation of a microprocessor having extendible logic.

BACKGROUND

Extendible microprocessors have been developed which allow the user to add application-specific logic extensions to a base microprocessor design. This technique seeks to share the benefits of a standard microprocessor design and application-specific logic. By utilizing a standard microprocessor, a designer would seek to perform the majority of required functions by executing program code. The designer will benefit from the flexibility of this approach—the function of the design can be changed after hardware is produced by changing the program code. The designer will also benefit by having access to existing software infrastructure such as compilers, debuggers, operating systems and application code. By utilizing an application-specific logic design, a designer could gain the maximum performance for the application with the minimum logic area—however the function of the design will be fixed in hardware and no changes can be made once the hardware is produced.

The extendible microprocessor shares the benefits of these two approaches—special application-specific extension instructions, registers and interfaces are added to the design. As in the standard microprocessor case, the function of the design is still controlled by a software program, hence the function of the design can still be changed after hardware is produced; and software infrastructure designed for the base microprocessor can be used with extended variants of the processor. High performance can be obtained as key parts of the program are accelerated by adding the application-specific extension functions.

Some disadvantages of the previously described approaches still exist—in some cases software designed for the base microprocessor must be modified for use with an extended variant, this applies especially to operating systems (OS); once hardware is produced the function of the application-specific extensions cannot be changed, meaning that any changes to the function of the design must be achieved by changes to the program that sequences the base and extension operations.

The description herein of various advantages and disadvantages associated with known apparatus, methods, and materials is not intended to limit the scope of the invention to their exclusion. Indeed, various embodiments of the invention may include one or more of the known apparatus, methods, and materials without suffering from their disadvantages.

As background to the techniques discussed herein, the following references are incorporated herein by reference:

U.S. Pat. No. 6,862,563 issued Mar. 1, 2005 entitled "Method And Apparatus For Managing The Configuration And Functionality Of A Semiconductor Design" (Hakewill et al.); U.S. Ser. No. 10/423,745 filed Apr. 25, 2003, entitled "Apparatus and Method for Managing Integrated Circuit Designs"; and U.S. Ser. No. 10/651,560 filed Aug. 29, 2003, entitled "Improved Computerized Extension Apparatus and Methods", all assigned to the assignee of the present invention.

SUMMARY

Thus, there exists a need for a microprocessor architecture which ameliorates and/or eliminates the above noted problems. In particular, there exists a need for a microprocessor architecture with reduced power consumption, improved performance and reduction of silicon footprint as compared with state of the art microprocessors. In addition, there exists a need to allow an operating system to be used with application-specific extensions added to an extendible processor. Furthermore, there exists a need to allow different sets of application-specific extensions to be used with a common operating system design, without requiring the user to make changes to that operating system.

In various embodiments, this is accomplished with a microprocessor architecture in which extendible logic may be added to the microprocessor through fixed-function hardware or programmable logic extensions. An extendible microprocessor may be configured to provide customizable operation specific logic. These operation specific logic blocks, known as extensions, may be implemented as fixed-function logic. These extensions may also be implemented through the addition of a block of dynamically configurable logic connected to the extendible processor. However, such logic may not and should not be available to all other processes. Thus, an extension register disable/enable function will be available to the OS to selectively disable or enable the access to extension registers and instructions. In various exemplary embodiments, when switching between processes the state of the current extendible logic must be stored for future calls to the same process. The operating system, because it was written prior to the extendible logic, will likely not understand how to handle requests for particular extendible operations or switches between operations. In various embodiments, a series of software extensions, analogous to device drivers, are installed to the OS which define properties such as the instruction and register locations associated with each extension and how that extension may be enabled/disabled. Also, recording all of the state information of a particular extendible logic configuration is very costly in terms of time. Therefore, in various embodiments, a technique known as lazy context switching is employed to perform context switches of extension state only when strictly necessary. When a task is switched out, access to all extension state is disabled but the contents of that extension state are not saved. After switching in a new task, when access to a specific extension is requested an exception is generated as access to that extension is disabled. In various exemplary embodiments, the OS calls the software extensions (drivers) to determine whether the exception is a genuine error, or a valid request to extension logic. When a task has made a valid request to use a disabled extension, the OS determines which task last used the disabled extension. If the last use was by the requesting task, no context switch is necessary. If the extension was last used by a different task, a context switch is performed. After this, the extension is enabled until the next task switch—when it is once more disabled.

At least one embodiment provides a method of selectively providing dynamically configurable extendible microprocessor logic supported by an operating system executing on the microprocessor. The method of selectively providing dynamically configurable extendible microprocessor logic supported by an operating system executing on the microprocessor according to this embodiment may comprise providing at least one block of dynamically configurable extension logic and at least one software extension to the operating system. On a software exception generated when a specific extension logic is requested, the operating system calls the least one software extension to handle dynamic configuration of the extendible logic of the microprocessor.

In this embodiment, all extensions are disabled on a task switch. When access to a specific extension is requested, an exception is generated as access to that extension is disabled. In various exemplary embodiments, the OS will call the software extensions (drivers) in order to determine whether the exception is a genuine error, or a valid request to extension logic. In addition to providing for lazy context switch, the OS calls the software extensions (drivers) to determine whether the extension logic expected by the task is loaded into the dynamically configurable extension logic block. If the required extension is loaded, no further action is necessary. If the extension is not loaded, the software extension controls loading of the required extension into the dynamically configurable extension logic block. This method is known as a virtual hardware extensions scheme due to its ability to dynamically configure (swap in) different extension logic hardware as required by any particular task.

At least one additional embodiment provides a method of selectively providing context switch support for extendible microprocessor logic to an operating system executing on the microprocessor. The method of selectively providing context switch support for extendible microprocessor logic to an operating system executing on the microprocessor according to this embodiment may comprise providing at least one software extension to the operating system, the software extension defining properties including instruction and register locations of the extendible logic and how that extendible logic may be enabled/disabled, generating a software exception when a specific extendible logic is requested, and in response to the exception, calling with the operating system the least one software extension to perform context switching of data contained within the specific extendible logic.

Another embodiment of the invention provides a method of selectively providing dynamically configurable extendible microprocessor logic to an operating system executing on the microprocessor. The method of selectively providing dynamically configurable extendible microprocessor logic to an operating system executing on the microprocessor according to the embodiment may comprise providing at least one software extension to the operating system, generating a software exception when a specific extension logic is requested, and in response to the exception, calling with the operating system the least one software extension to handle dynamic configuration of the extendible logic of the microprocessor.

A further embodiment of the invention provides an extendible microprocessor. The extendible microprocessor according to this embodiment may comprise a microprocessor having a multi-stage instruction pipeline, and an extension interface to the instruction pipeline adapted to complement a standard microprocessor instruction set with customized processor instructions and registers.

Still another embodiment of the invention provides a microprocessor architecture. The microprocessor architecture according to this embodiment may comprise a multi-stage instruction pipeline, an instruction extension interface for interfacing with at least one stage of the instruction pipeline, a plurality of extension applications available to an operating system through the instruction pipeline, a required extension determining circuit, routine or application for identifying instructions in the pipeline that require one of the plurality of extension applications, and an extension register disable/enable circuit, routine or application available to the operating system for selectively enabling and disabling extension applications.

Other aspects and advantages of the invention will become apparent from the following detailed description, taken in conjunction with the accompanying drawings, illustrating by way of example the principles of the invention.

DETAILED DESCRIPTION

The following description is intended to convey a thorough understanding of the invention by providing specific embodiments and details involving various aspects of a new and useful microprocessor architecture. It is understood, however, that the invention is not limited to these specific embodiments and details, which are exemplary only. It further is understood that one possessing ordinary skill in the art, in light of known systems and methods, would appreciate the use of the invention for its intended purposes and benefits in any number of alternative embodiments, depending upon specific design and other needs.

Figure 1:
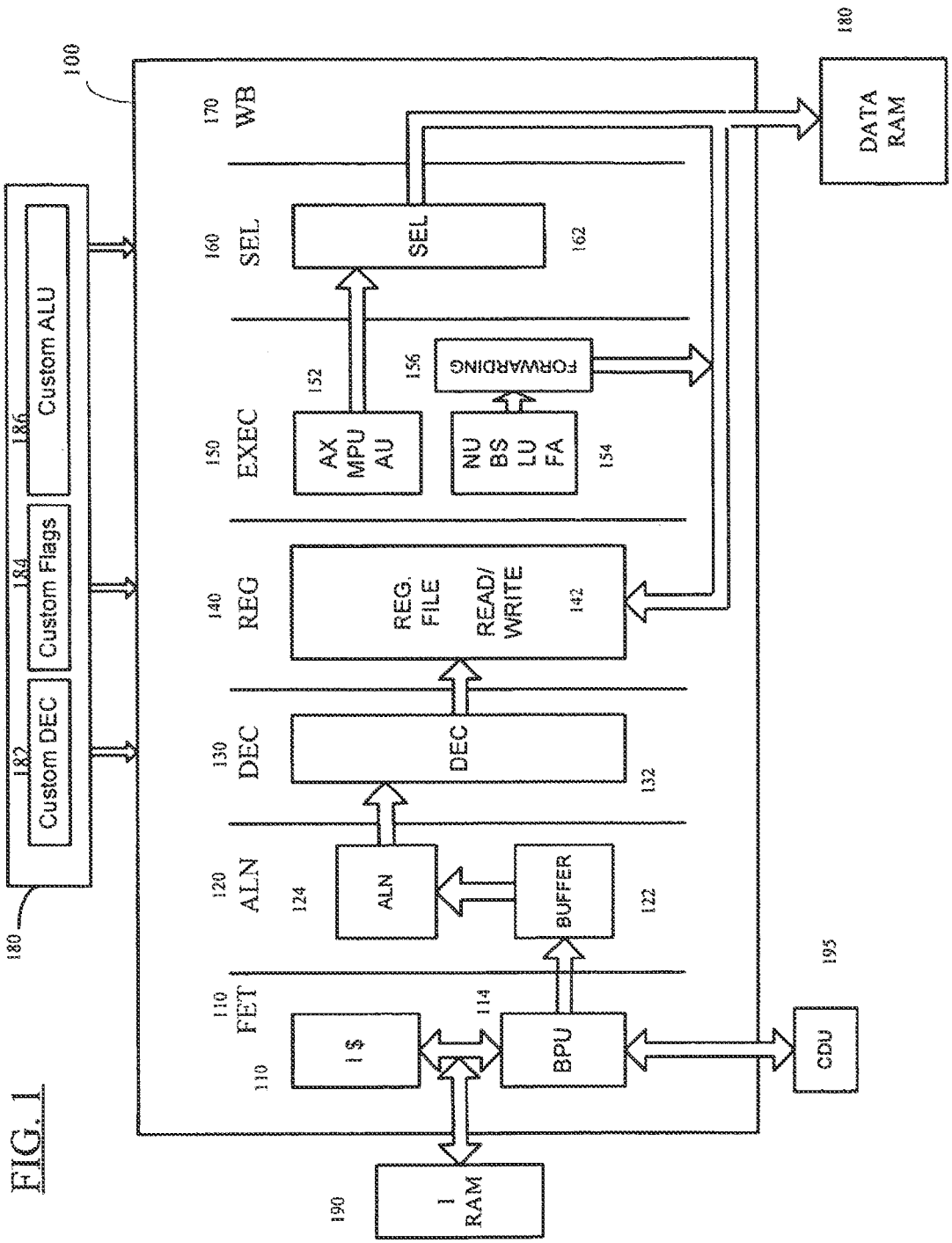
FIG. 1 is a block diagram illustrating a processor core in accordance with at least one exemplary embodiment of this invention.

Discussion of the invention will now made by way of example in reference to the various drawing figures. FIG. 1 illustrates in block diagram form, an architecture for a microprocessor core 100 and peripheral hardware structure in accordance with at least one exemplary embodiment of this invention. Several novel features will be apparent from FIG. 1 which distinguish the illustrated microprocessor architecture from that of the conventional microprocessor architecture. Firstly, the microprocessor architecture of FIG. 1 features a processor core 100 having a seven stage instruction pipeline. An align (ALN) stage 120 is shown in FIG. 1 following the fetch (FET) stage 110. Because the microprocessor core 100 shown in FIG. 1 is operable to work with a variable bit-length instruction set, namely, 16-bits, 32-bits, 48-bits or 64-bits, the align stage 120 formats the words coming from the fetch stage 110 into the appropriate instructions.

In various exemplary embodiments, instructions are fetched from memory in 32-bit words. Thus, when the fetch stage 110 fetches a 32-bit word at a specified fetch address, the entry at that fetch address may contain an aligned 16-bit or 32-bit instruction, an unaligned 16 bit instruction preceded by a portion of a previous instruction, or an unaligned portion of a larger instruction preceded by a portion of a previous instruction based on the actual instruction address. For example, a fetched word may have an instruction fetch address of 0x4, but an actual instruction address of 0x6. In various exemplary embodiments, the 32-bit word fetched from memory is passed to the align stage 120 where it is aligned into an complete instruction. In various exemplary embodiments, this alignment may include discarding superfluous 16-bit instructions or assembling unaligned 32-bit or larger instructions into a single instructions. After completely assembling the instruction, the N-bit instruction is forwarded to the decoder 130.

Still referring to FIG. 1, an instruction extension interface 180 is also shown which permits interface of customized processor instructions that are used to complement the standard instruction set architecture of the microprocessor. Interfacing of these customized instructions occurs through a timing registered interface to the various stages of the microprocessor pipeline 100 in order to minimize the effect of critical path loading when attaching customized logic to a pre-existing processor pipeline. Specifically, a custom opcode slot is defined in the extensions instruction interface for the specific custom instruction in order for the microprocessor to correctly acknowledge the presence of a custom instruction 182 as well as the extraction of the source operand addresses that are used to index the register file 142. The custom instruction flag interface 184 is used to allow the addition of custom instruction flags that are used by the microprocessor for conditional evaluation using either the standard condition code evaluators or custom extension condition code evaluators in order to determine whether the instruction is executed or not based upon the condition evaluation result of the execute stage (EXEC) 150. A custom ALU interface 186 permits user defined arithmetic and logical extension instructions the result of which are selected in the result select stage (SEL) 160.

Figure 2:
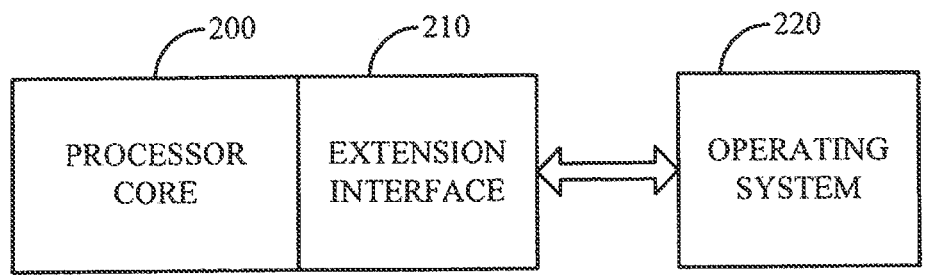
FIGS. 2 and 3 are block diagrams illustrating a microprocessor architecture utilizing operating system supported virtual hardware extensions in accordance with at least one exemplary embodiment of this invention.
Figure 3:
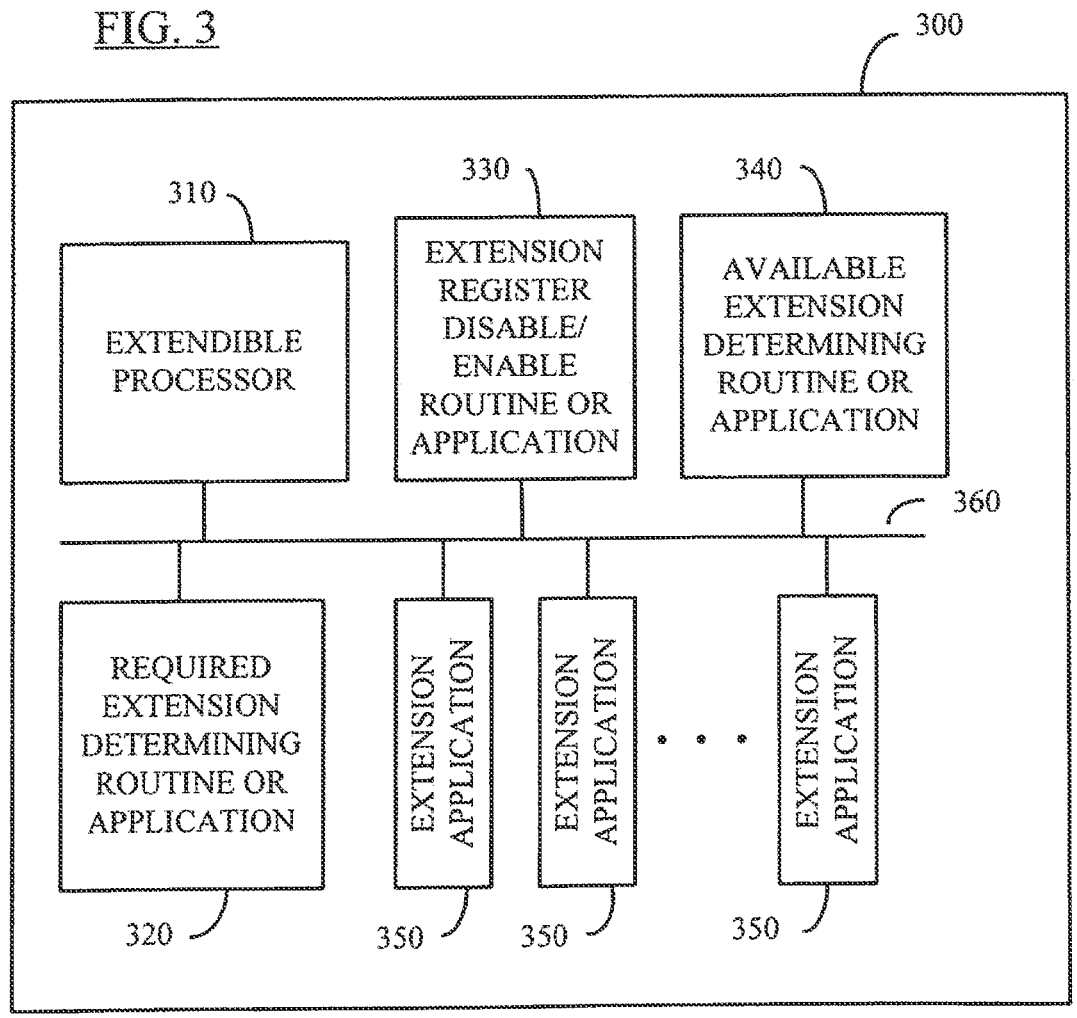

FIGS. 2 and 3 are block diagrams illustrating a microprocessor architecture utilizing operating system supported virtual hardware extensions in accordance with at least one exemplary embodiment of this invention. A microprocessor in accordance with at least one embodiment of this invention is capable of logic extension by a user by way of an interface by which extension instructions and registers may be added. Certain slots in the processor's instruction set and register map are reserved to functions reached through this interface. By this interface, special instructions including digital signal processor (DSP) instructions, state machine and related machine state may be extended to the processor in order to make available and/or accelerate applications critical to implementers (customers) of the microprocessor.

In various exemplary embodiments,' this extension interface may be used to add fixed function logic, as in an application specific integrated circuit (ASIC), or may be connected to an array of programmable logic (FPGA or PLD block). When connected to an array of programmable logic, it will be possible to dynamically change the behavior of the extension functions based on the current needs of the system. This embodiment of the invention provides a system in which an array of programmable logic is connected to the extension interface of a microprocessor, and the microprocessor has a mechanism by which it can reconfigure the programmable logic array based on context. As result, the CPU can dynamically reconfigure the extension instructions/registers available to programs running on the processor.

A problem with implementing an interface between an extendible processor and an operating system (OS) is that the OS is usually codified before the processor and any extension software interface has been created. As a result, the OS is incapable of dealing with these extensions without the assistance of drivers or other software routines. FIGS. 2 and 3 illustrate the basic components of a system for in accordance with this embodiment of the invention. FIG. 2 illustrates a microprocessor core 200 that includes a dynamically reconfigurable extension instruction/register logic accessed through an extension interface 210. The extension interface 210 communicates with a software interface 220 of the operating system in response to demands of the operating system. FIG. 3 illustrates a system 300, which can be dynamically reconfigured under the control of the microprocessor. The system 300 includes an extendible processor 310, a required extension determining routine or application 320, an extension register disable/enable routine or application 330, an available extension routine or application 340 and one or more extension applications 350, all interconnected by software interface 360.

In various exemplary embodiments, the required extension determining routine or application 320 will inform the OS which of the possible extension functions are required by a particular program or user application. In various exemplary embodiments, this could take the form of an extension to the ELF executable format. The extension register disable/enable routine or application 330 permits the OS to enable or disable access to extension instructions or registers, either individually or as a group. If an access is made or attempted while the OS has disabled the extension function, an exception is taken. In various exemplary embodiments, the available extension routine or application 340 informs the OS about an available extension function or group of functions. In various exemplary embodiments, this will include configuration information about the extension, including at least which extension instruction slots are used, which extension register slots are used and names of instructions and register used for disassembly and debug. In various exemplary embodiments, this will also include a software function by which the OS can determine if the required extension function is already built into the microprocessor, a software model of the extension to allow software emulation if the extension is not available in hardware, and optionally, a configuration file containing the required extension for reconfigurable hardware connected to the extension interface.

In various exemplary embodiments, before running an application, the user or administrator would register (install) available extension functions with the OS, analogous to a virtual device under Microsoft WINDOWS™. Also, because context switching between extensions requires storing state information of the extendible hardware, a technique known as lazy context switching is used to manage context switching of both machine state stored in both fixed function extensions and dynamically reconfigurable extensions.

In various exemplary embodiments, when a user application is executed, no extension functions are loaded or enabled. The OS will check to ensure that an extension function specified by the program has been registered. Any access to an extension function (e.g., register read or write, extension instruction execution) by the program will cause an exception—either an illegal instruction exception or an extension disabled extension. In various exemplary embodiments, this will cause the OS to check to see if the instruction exception is caused by an access to an extension function that is required by the program (as specified in the ELF file). Otherwise, the error is a true illegal instruction error and the OS takes its normal error handling action.

In various exemplary embodiments, if the extension to which access is being attempted is specified as being required by the program as determined by the required extension determining routine or application 320, the OS may take one of the following courses of action. If the extension is already built into the microprocessor, the extension (or extension group containing the function) can be enabled. Before the program is allowed to continue, it may be necessary to context switch any state stored in the extension (lazy context switch) if the extension has been in use by some other task. This technique is often used by an OS to minimize the context switch time. Alternatively, if the extension required is available as a dynamically reconfigurable block, the OS must determine whether the extension is already loaded using the available extension routine or application 340. If so, the OS can then check to see if any state in the extension needs to be context switched. If the extension is not loaded, the OS must save the machine state from an extension configuration that is loaded prior to loading the required extension configuration into the dynamically reconfigurable block. The extension (or extension group containing the function) can then be enabled and the program allowed to continue. Finally, if the extension required is not available as a built-in function, or as a dynamically reconfigurable block, the appropriate emulation code (as registered with the OS) can be called to perform the required function in the absence of an existing hardware extension.

The above described embodiment, by making extensions to the OS error handling code and to the executable file format, provides unexpected benefits including, that a common OS can be used on many different configured microprocessors, different executable programs complied for a common Instruction Set Architecture (ISA), but using different sets of extension functions can be run under a multi-tasking OS on any microprocessor using the using the common ISA using software emulation of extension functions, or built-in extension functions themselves. Also, different executable programs compiled for a common ISA, but using different sets of extension functions can be run at speed under a multi-tasking OS on any microprocessor using the common ISA, when that microprocessor features dynamically reconfigurable extension logic. As a result, this could provide a powerful development platform for extension functions by which extension functions can be prototyped in software or programmable logic while also running in a real OS-based environment. Also, this could be used to deliver a field-upgradeable system whereby a new piece of software would be accompanied by hardware acceleration for key functions of that software, making use of dynamically reconfigurable hardware. Existing functions using other extension functions would still be able to operate as the OS can seamlessly manage which extension functions must be present in the dynamically reconfigurable hardware for each task.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

What is claimed is:

1. An extendible microprocessor system comprising:
    a microprocessor including a microprocessor instruction set; and
    an extension interface coupled to the microprocessor, the extension interface including customized processor instructions adding functionality to the microprocessor instruction set included in the microprocessor, the customized processor instructions associated with an illegal instruction exception and an extension disabled exception, the illegal instruction exception indicating that access to one or more of the customized processor instructions is prohibited and the extension disabled exception indicating that one or more of the customized processor instructions is available;
    a system coupled to the microprocessor via the extension interface, the system configured to:
        generate, based on whether one of the customized processor instructions is required by a program, either the illegal instruction exception or the extension disabled extension when the one of the customized processor instructions is requested by the program; and
        perform, responsive to the extension disabled exception due to the program requiring the requested one of the customized processor instructions, context switching of data contained within the requested one of the customized processor instructions.

2. The extendible microprocessor system of claim 1, wherein the extension interface includes an interface configured to receive user definitions of extension instructions from a user.

3. The extendible microprocessor system of claim 1, wherein the extension interface includes an instruction flag interface configured to receive custom instruction flags used by the microprocessor to determine whether to execute a customized processor instruction using standard evaluators or custom extension evaluators.

4. The extendible microprocessor system of claim 1, wherein the extension interface further includes extension registers.

5. The extendible microprocessor system of claim 4, wherein the system is further configured to perform steps comprising:
    selectively disabling or enabling the customized processor instructions and the extension registers.

6. The extendible microprocessor system of claim 1, wherein the system is further configured to perform steps comprising:
    switching between the customized instructions.

7. The extendible microprocessor system of claim 6, wherein switching comprises the system performing steps including storing a current state of customized processor instructions for future calls to the customized processor instructions.

8. The extendible microprocessor system of claim 7, wherein storing comprises the system performing steps including performing lazy context switching.

9. The extendible microprocessor system of claim 6, wherein switching comprises the system performing steps including reconfiguring a block of reconfigurable logic connected to the extension interface.

10. The extendible microprocessor system according to claim 9, wherein switching comprises the system performing steps including storing a state of the reconfigurable logic for future calls.

11. The extendible microprocessor system according to claim 10, wherein storing comprises the system performing steps including performing lazy context switching.

12. The extendible microprocessor system according to claim 1, wherein the system is further configured to perform steps comprising:
    determining if a last use of the one of the customized processor instructions was by the program requesting the one of the customized processor instructions; and
    performing a context switch if the one of the customized processor instructions was last used by a different program.

13. A method of selectively providing context switch support for extendible microprocessor logic of a microprocessor to a system executing on the microprocessor, the method comprising:

providing, by the system, at least one software extension defining customized processor instructions that add functionality to a microprocessor instruction set included in the microprocessor, the customized processor instructions associated with an illegal instruction exception and an extension disabled exception, the illegal instruction exception indicating that access to at least one customized processor instruction is prohibited and the extension disabled exception indicating that the at least one customized processor instruction is available but access is currently disabled;

causing the at least software extension to determine whether an exception generated responsive to a program requesting at least one of the customized processor instructions is either the illegal instruction exception or the extension disabled extension based on whether the at least one of the customized processor instructions being required by the program; and in response to the extension disabled exception due to the program requiring the at least one of the customized processor instructions, calling the at least one software extension to perform context switching of data contained within the at least one of the customized processor instructions.

14. The method according to claim 13, further comprising:
selectively disabling or enabling access to the at least one of the customized processor instructions of the microprocessor.

15. The method according to claim 13, further comprising:
switching between programs using the at least one of the customized processor instructions.

16. The method according to claim 15, wherein switching between the programs uses lazy context switching.

17. The method according to claim 16, wherein performing lazy context switching includes storing a state of the data contained within the at least one of the customized processor instructions.

18. The method according to claim 16, further comprising:
determining if a last use of at least one of the customized processor instructions was by the program requesting the at least one of the customized processor instructions; and
performing a context switch if the at least one of the customized processor instructions was last used by a different program.

19. A system for selectively providing context switch support for extendible microprocessor logic of a microprocessor, the system including:
a non-transitory computer-readable storage medium storing instructions, the instructions configured to:
provide at least one software extension defining customized processor instructions that add functionality to a microprocessor instruction set included in the microprocessor, the customized processor instructions associated with an illegal instruction exception and an extension disabled exception, the illegal instruction exception indicating that access to at least one customized processor instruction is prohibited and the extension disabled exception indicating that the at least one customized processor instruction is available but access is currently disabled;
cause the at least software extension to determine whether an exception generated responsive to a program requesting at least one of the customized processor instructions is either the illegal instruction exception or the extension disabled extension based on whether the at least one of the customized processor instructions being required by the program; and
in response to the extension disabled exception due to the program requiring the at least one of the customized processor instructions, call the at least one software extension to perform context switching of data contained within the at least one of the customized processor instructions.

20. The system according to claim 19, wherein the instructions further configured to:
selectively disable or enable access to the at least one of the customized processor instructions of the microprocessor.

* * * * *